United States Patent [19]

Nilsson

[11] Patent Number: 4,890,122

[45] Date of Patent: Dec. 26, 1989

[54] METHOD AND APPARATUS FOR INCREASING INKING RESOLUTION IN AN INK MOSAIC RECORDING DEVICE

[75] Inventor: Kenth Nilsson, Akersberga, Sweden

[73] Assignee: Siemens Aktiengesellschaft, Berlin and Munich, Fed. Rep. of Germany

[21] Appl. No.: 902,050

[22] Filed: Aug. 26, 1986

Related U.S. Application Data

[63] Continuation of Ser. No. 666,207, Oct. 29, 1984, abandoned.

[30] Foreign Application Priority Data

Nov. 15, 1983 [DE] Fed. Rep. of Germany ....... 3341399

[51] Int. Cl.[4] .............................................. G01D 15/18

[52] U.S. Cl. .................................. 346/140 R; 346/1.1

[58] Field of Search ..................... 346/1.1, 75, 140 PD

[56] References Cited

U.S. PATENT DOCUMENTS

| | | | |
|---|---|---|---|
| 4,072,959 | 2/1978 | Elmqvist | 346/140 |
| 4,240,081 | 12/1980 | Devitt | 346/75 |
| 4,349,828 | 9/1982 | Fischbeck et al. | 346/140 PD X |
| 4,379,300 | 4/1983 | Fischbeck | 346/140 PD X |
| 4,520,368 | 5/1985 | Ims | 346/75 |
| 4,524,364 | 6/1985 | Bain et al. | 346/140 PD X |

FOREIGN PATENT DOCUMENTS

| | | |
|---|---|---|
| 2262106 | 6/1973 | Fed. Rep. of Germany . |
| 2543451 | 3/1977 | Fed. Rep. of Germany . |
| 2527647 | 6/1981 | Fed. Rep. of Germany . |
| 1347097 | 2/1974 | United Kingdom . |

OTHER PUBLICATIONS

Master Catalogue 1983—Electronic Instruments—Bruel & Kjaer, "Vibration Transducers and Accessory Equipment".

*Primary Examiner*—George H. Miller, Jr.

*Attorney, Agent, or Firm*—Hill, Van Santen, Steadman & Simpson

[57] ABSTRACT

A method and apparatus for increasing inking resolution in an ink-mosaic recording device. In order to increase the inking resolution in a simple manner, a recording head is periodically deflected transversely to a direction of ejection of the drop of fluid, and the ejection is synchronized with this deflection. Thus a transverse speed component may be superimposed on the drop so that an encountering point on the recording carrier is shiftable. With a same number of transducers and constant transducer spacing, the recording points may be positioned closer to one another.

10 Claims, 3 Drawing Sheets

METHOD AND APPARATUS FOR INCREASING INKING RESOLUTION IN AN INK MOSAIC RECORDING DEVICE

This is a continuation, of application Ser. No. 666,207, filed Oct. 29, 1984.

BACKGROUND OF THE INVENTION

The invention relates to a method for increasing inking resolution in an ink-mosaic recording device with a recording head having a number of piezoelectric transducers arranged in series. Through a piezoelectric deformation of the transducers, dropwise recording fluid is directionally ejected onto a recording-carrier. Furthermore, the invention relates to an arrangement for carrying out this method. Ink-mosaic recording devices are, for example, rod-shaped transducers arranged in parallel with one another and lying opposite a nozzle-plate, as is known from German Patent Specification No. 25 27 647, incorporated herein by reference, and in the following will be designated in brief as comb-recorders. The rod-shaped transducers may in this connection be attached to one another a one side or on both sides through a stem or common base portion. It is to be further understood that the recording devices indicated in the earlier German patent application No. P 33 20 441, incorporated herein by reference, having a pre-tensioned comb closed on both sides through a stem may also be employed. Furthermore, the recording head for the ink-mosaic recording device may also contain a channel-matrix indicated in the earlier German Patent Application No. P 33 06 098, incorporated herein by reference, with or without a matrix of holes. It is to be further assumed that the ink-mosaic recording device may be constructed in similar manner as the device known from the German Published Specification No. 25 43 451, incorporated herein by reference, in which a series of ink channels are to be guided radially from piezoelectric pressure chambers to ink nozzles.

In the case of all of these ink-mosaic recording devices, primarily an inking resolution of approximately four drops of ink per millimeter is attained. For an improvement of the type character, about 10 of such ink-drops would be desirable. A known solution of this problem with a comb-recorder provides, for example, for arranging several piezoelectric combs offset to one another in a direction of paper transport. This requires, however, a doubling of the electronics, and under certain circumstances e.g. insufficient paper feed accuracy may also lead to a distortion in the type character. A diminishing of the spacing between the piezoelectric transducers, for example with the comb-recorder, increases, apart from production difficulties, appreciably the danger of hydraulic coupling between the transducers.

SUMMARY OF THE INVENTION

An object of the present invention is to provide a method with which the inking resolution in an ink-mosaic recording device of the type mentioned at the beginning can be increased in simple manner and without additional piezoelectric transducers.

This problem is solved in accordance with the invention since the recording head is periodically deflected transversely to the direction of ejection, and the ejection of the drops of fluid is synchronized with this deflection. Principally two ways are possible for this purpose. For one thing, the deflection may take place with a large amplitude, which corresponds approximately to one-fourth of the spacing between the drops of fluid produced with a resting recording head. If, as an example, a comb-recorder with four nozzles per millimeter is provided, an amplitude of about 60 μm would result. The synchronization would in this case have to take place so that a drop of fluid will be ejected in each case at a maximum deflection in the one or the other direction. In this way and manner, the number of drops per millimeter will be doubled. In this case, the recording head is found at the moment of the ejection of a drop of fluid practically at rest, i.e., no speed component will be superimposed transversely to the course or direction of flight.

On the other hand, it is possible in an advantageous development of the invention, that the deflection amounts to a fraction of the spacing of adjacent transducers and takes place with a frequency so high that there may be superimposed on the drop of fluid a sufficiently high speed component transversely to the direction of ejection in order to be able to shift the encountering point of the drop on the record carrier at a maximum by half the spacing of two adjacent points given a resting recording head.

In order again to relate to the example of the combrecorder with four nozzles per millimeter, a deflection of 10 to 20 μm is completely sufficient. This very much simplifies the design. If the recording head is deflected sinusoidally, then the synchronization is simplified, especially if the ejection of the drop in each case is undertaken at zero passage of the sine and at least at a peak. Upon zero passage, the greatest transverse component of speed is superimposed on the drop, so that the drop ejected at this point of time is pushed approximately by half the spacing of two adjacent drops given a resting recording head. At the peak, the transverse speed of the recording head is practically zero, so that no transverse speed component is superimposed to the drop. As the deflection amplitude amounts to only a few μm, one may roughly compare these ejected drops with a drop ejected by a resting recording head in the zero position. In all, in this manner through each nozzle three different layers of drops may be attained, and a substantial increase of the inking resolution results.

It is a particular advantage with this type of synchronization, that the speed (given a sinusoidal deflection) in the area of the zero passage and likewise at the peak over a relatively great period of time is almost constant. This means, however, that the time of the ejection of a drop in this area may fluctuate without substantial influence on the type character. The requirements as to electronics for the timely synchronization of deflection and ejection of the drop are therefore very minimal.

With an expensive synchronization, and for example also another deflection function, it is possible to increase still further the type of recording at each nozzle. Principally, the recording points may be laid as close as desired. A possible disadvantage with this method could be that the recording speed of the ink-mosaic recording device, and thus the speed of paper transportation upon recording of two or more points per piezoelectric transducer, must be lowered. However, since the high recording quality is not in all cases necessary with close-lying recording points, in a further development of the invention, a change-over may be provided so that the recording head rests and thus records only the number of points corresponding to the piezoelectric transducers. It thus can operate with the highest possible recording speed. If a high inking resolution is desired, the periodic deflection is undertaken. Then a diminishing of the recording speed occurs.

For carrying out the method, in a further development of the invention, an arrangement is provided in which the recording head is mounted for lateral deflection on a piezoelectric oscillator. Thus, in a simple manner, an exact deflection frequency and deflection amplitude is adjustable, this being important for synchronization with the ejection of the drop.

DESCRIPTION OF THE PREFERRED EMBODIMENTS

Figure 1:
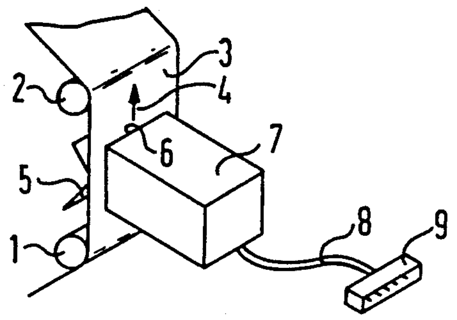
FIG. 1 shows a diagrammatic view of an ink-mosaic recording device.
Figure 2:
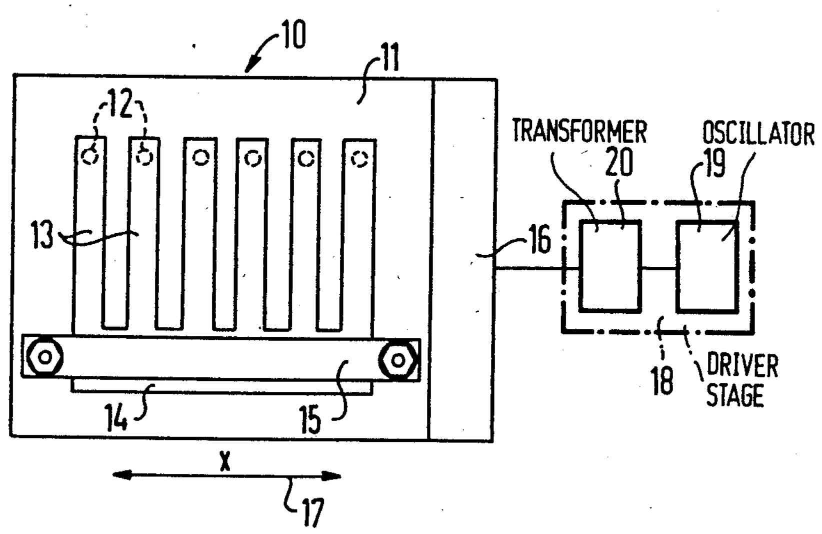
FIG. 2 shows a diagrammatic view of a recording head used in the device of FIG. 1.

FIG. 1 shows the outer principal construction of an ink-mosaic recording device. Over transporting rolls 1 and 2, the recording carrier 3 (for example normal recording paper) is passed in a direction of the arrow 4 through spacer 5 on the front side 6 of the housing 7. From the housing, a connection cable 8 is provided which at its free end has a plug or connector 9 for attachment to a corresponding controller. The cable 8 supplies the control signals for the recording of the desired paths, signals, or images, and for the synchronization between the periodic deflection and ejection of the individual drops. The housing 7 contains the actual recording head, of which a possible embodiment is shown in FIG. 2.

The recording head is formed of a nozzle plate 11 which may at the same time be the cover plate of the ink-mosaic recording device. This nozzle plate 11 contains a series of nozzles 12 arranged in parallel and spaced with respect to one another. Above the nozzles are arranged rod-shaped piezoelectric transducers 13 which are attached through a common base portion or stem 14 at one end, and are rigidly connected in this area by means of a fastening arrangement 15 with the nozzle plate 11. The piezoelectric transducers 13 are contacted such that through alteration in voltage at the contacting, a deformation occurs which leads to the ejection of an ink-drop from the corresponding nozzle 12. This recording head is rigidly connected with a further piezoelectric element 16. Such an element 16 is contacted in such manner that upon application of a corresponding alternating voltage, a periodic deflection of the recording head lying in direction of the arrow 17 takes place. The deflection thus takes place perpendicularly to the ejection direction and parallel with the series of nozzles. The size of the deflection is indicated with X.

The contactings can, for example, be situated on the upper and lower side of the piezoelectric element 16. A driver stage 18 with an oscillator 19 serves as an alternating voltage source. In order to obtain an adequately high driver voltage, a transformer 20 additionally follows.

In the following FIG. 3, the deflection X is plotted over the time t. It is assumed in this connection that the piezoelectric oscillator 16 deflects the recording head somewhat sinusoidally. In the present embodiment, by way of example the deflection amounts to only a small fraction of the spacing of adjacent nozzles, and as the case may be, a transverse component of speed will be superimposed on the ejected ink drops.

Figure 3:
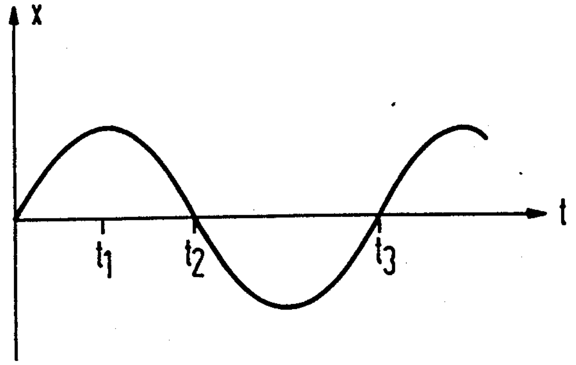
FIG. 3 shows a chronological deflection of the recording head according to FIG. 2.

As an example, in FIG. 3 are plotted the time points $t_1$ to $t_3$ at which in each case a drop of ink is ejected. At time point $t_1$, in this connection the speed of the recording head is zero, i.e. no transverse-component speed is superimposed on the ejected ink drop. The recording head is at this time point deflected to a maximum extent. As this extent is, however, very small in relation to the spacing of adjacent nozzles, one may compare this produced drop in practice with a drop of ink ejected given a resting recording head. At the points of time $t_2$ and $t_3$, in each case transverse components of speed are superimposed on the ejected drop of ink since the recording head at this point of time has the greatest deflection speed. The deflection at the time $t_3$ takes place in an opposite direction than at time $t_2$.

For a concrete example, it is assumed that the spacing between the nozzles amounts to about 250 μm. The maximum spacing which is produced by means of the piezoelectric oscillator 16 is about 20 μm. Furthermore, it is assumed that the individual piezoelectric transducers 13 operate with a maximum frequency of 4000 Hz. In order to be able to carry out the synchronization indicated in FIG. 3 between deflection and ink-drop ejection, the deflection frequency may in this connection not be greater than 1000 Hz. The maximum transverse component of speed which may be superimposed on the ink drop amounts to approximately 0.12 meters per second, and is sufficient in order (with a spacing of the recording carrier from the nozzle-plate of some millimeters) to shift the encountering point of the ink drop by about one-third of the spacing of adjacent nozzles.

It is noted at this point, that the path deflection can also take place after or according to other functions than the sine-function. Likewise, it is possible to otherwise select the time point of ejection. Principally, it is possible to select a greater number of time points to lay the recording points as close as desired. In case of necessity, in order to be able to attain greater transverse speed components, a much higher deflection frequency may be selected. The different ejection points then no longer lie in one deflection period.

Figure 4:
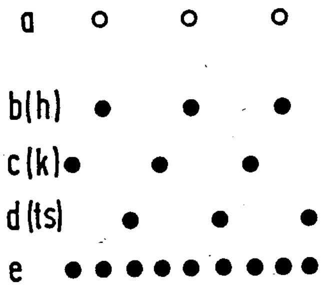
FIGS. 4*a* a through 4*e* show the recording points relative to the recording nozzles at various times.

In FIG. 4, by way of example it will be explained how the higher inking resolution occurs. In FIG. 4*a*, in this connection for the sake of simplicity, nozzles are shown from which in each case and at the same time drops of ink are to be ejected. In FIG. 4*b* are indicated the recording points at the time point $t_1$ which practically agree with the extended nozzle sites. In FIG. 4*c* are indicated the recording points at the time point $t_2$ when the recording points are pushed to the left. FIG. 4*d* shows the recording points at the time point $t_3$, when the recording points are correspondingly pushed to the right. FIG. 4*e* finally shows all of the recording points possible. With the aid of the three nozzles, in this manner already nine recording points can be attained.

Figure 5:
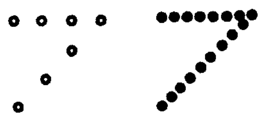
FIG. 5 shows the comparison of the invention with and without a periodic deflection or chronological excursion.

FIG. 5 shows in a comparison the difference between a recording of a desired signal, in this example the numeral 7, with a resting recording head, and next to it a periodically deflected recording head. With four nozzles per millimeter, there results already twelve recording points per millimeter, i.e. resulting for a naked-eye observation as a closed type character.

Figure 6:
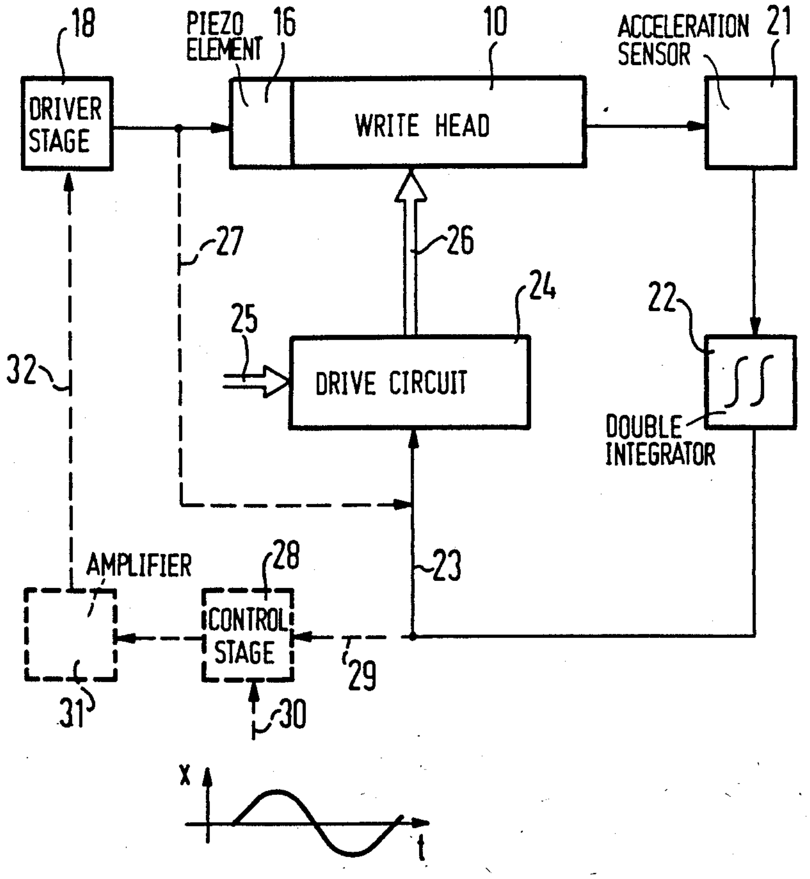
FIG. 6 shows in block diagram a synchronization system between periodic excursion and drop ejection.

FIG. 6 again schematically shows the write head 10 with the additional piezo element 16 as well as the driver stage 18. An acceleration sensor 21 such as known, for example, from the "Master Catalogue 1983" of Bruel and Kjaer, page 145, incorporated herein by reference, is also connected to the write head 10. The sensor signal is wired to a double integrator 22 whose output signal corresponds to the respective position of the write head. This signal is forwarded via a line 23 to a drive circuit 24 for the write head 10. As indicated by the arrow 25, the printing data are forwarded to the drive circuit at the input side. Via the synchronization signal on the line 23, the corresponding print instructions are forwarded to the write head 10 via the line 26. Given employment of a piezo element 16 and of a stable driver stage 18, it is also simple to employ the driver signal itself as a synchronization signal, as is indicated in broken lines with the line 27.

As likwise shown with broken lines, a control stage 28 to which the output signal of the integrator 22 is supplied via a line 29 as an actual value, can additionally be provided in other excursion arrangements. The rated value is input via a line 30, as shown in the diagram under the arrow 30, and can have a sinusoidal curve over time. The control signal is forwarded to the driver stage 18 via an amplifier 31 and the line 32.

The deflection of the recording head may be disconnectible so that in case of need, for example for layouts with less inking resolution and therefore with a higher paper speed, treatment may take place. The special advantage according to the invention is that for both cases, i.e. low or high resolution, always only one recording head and thus one electronics drive is necessary. The additional expenditure for the increase of the inking resolution is therefore limited to a minimum.

Although various minor changes and modifications might be proposed by those skilled in the art, it will be understood that I wish to include within the claims of the patent warranted hereon all such changes and modifications as reasonably come within my contribution to the art.

I claim as my invention:

1. A method for increasing inking resolution of an ink-mosaic recording device having a recording head with a plurality of piezo-electric transducers arranged in a row, comprising the steps of:

ejecting recording fluid drop-wise towards a recording carrier through a piezo-electric deformation of the transducers;

deflecting the recording head periodically and transversely to a direction of ejection of the drops of fluid;

providing the deflection of the recording head as a fraction of a spacing of adjacent transducers, and providing the deflection as a periodical deflection at a frequency sufficiently high such that a sufficiently large component of speed is superimposed on a drop of the ejected liquid transversely to the direction of ejection and in the direction of deflection of the recording head in order to shift when desired an encountering point of the drop on the recording carrier by a required distance substantially greater than the recording head deflection as a result of the superimposed component of speed; and synchronizing the ejection of the drops of fluid with the transverse deflection.

2. A method according to claim 1 including the step of sinusoidally deflecting the recording head and ejecting the drop of fluid upon zero passage of the sinusoidal deflection.

3. A method according to claim 1 including the step of sinusoidally deflecting the recording head and ejecting the drop of fluid upon zero passage of the sinusoidal deflection and also at a peak of each sinusoidal deflection.

4. A method according to claim 1 wherein the deflection of the recording head is a maximum of 20 $\mu$m.

5. A method according to claim 4 wherein a spacing between the nozzles is approximately 250 $\mu$m.

6. A method for increasing inking resolution of an ink-mosaic recording device having a recording head with a plurality of ink-emitting elements, comprising the steps of:

ejecting ink recording fluid dro-wise from the ink emitting elements towards a recording carrier travelling in a first direction;

deflecting the recording head periodically transversely to a direction of ejection of the recording fluid and also transverse to the first direction;

providing the periodic deflection of the recording head such that said deflection has a maximum amplitude which is a relatively very small portion of a spacing of adjacent ink emitting elements, and providing the deflection at a frequency sufficiently high such that a sufficiently large component of speed is superimposed on the drop of ink in a direction transverse to the first direction of movement of the recording carrier in order to be able to shift when desired an encountering point of the ink drop on the recording carrier a distance substantially greater than the deflection of the recording head and to a point intermediate adjacent ink emitting elements on the recording carrier.

7. A method according to claim 6 wherein the component of speed which is superimposed on the ink drop is sufficient to permit the drop to strike the recording carrier approximately at a point about one-third of the spacing between the adjacent ink-emitting elements.

8. A method according to claim 6 including the step of ejecting the drop of fluid approximately at a time when the recording head is being deflected at maximum speed.

9. A method according to claim 8 wherein the ejection occurs substantially at a point half-way between maximum deflection points during a deflection period.

10. A method according to claim 6 including the steps of providing the recording head as a combshaped recorder element formed of a plurality of parallel rod-shaped piezo transducers joined at a common base portion wherein a piezo-electric element is mechanically connected laterally of a longitudinal extending direction of said rod-shaped piezo transducers, and energizing the piezo electric element with electric current so as to cause transverse movement of the rod-shaped piezo transducer elements relative to the drop ejection direction at said sufficiently high frequency.

* * * * *